United States Patent
Slavitt

[15] 3,679,262
[45] July 25, 1972

[54] LEG REST FOR VEHICLE DRIVER'S SEAT

[72] Inventor: Eugene Slavitt, 11987 Audubon Ave., Philadelphia, Pa. 19116

[22] Filed: Nov. 19, 1970

[21] Appl. No.: 91,059

[52] U.S. Cl. ................................................... 297/427
[51] Int. Cl. ........................................................ A47c 7/50
[58] Field of Search ..................... 297/414, 427; 5/317, 327

[56] References Cited

UNITED STATES PATENTS

| | | | |
|---|---|---|---|
| 2,650,654 | 9/1953 | Twiford | 297/427 |
| 2,522,887 | 9/1950 | Nelson | 5/327 X |
| 2,086,244 | 7/1937 | Smith | 297/414 |

*Primary Examiner*—Casmir A. Nunberg
*Attorney*—Edelson and Udell

[57] ABSTRACT

An auxiliary leg rest attachable to the seat of a vehicle next to the right leg of the driver to support the leg and prevent fatigue and muscle strain. The rest is made of formed plastic with a base seatable on the vehicle seat and having a downturned front which anchors the base against rearward shift by abutting the nose of the vehicle seat and a side wall extending angularly upward from the base and against which the thigh of the driver rests. A resilient cushion is secured to the underside of the base and frictionally engages the vehicle seat to prevent side shifting of the leg rest due to thigh pressure. An adjustable anchoring strap secures the leg rest to the seat in desired position by means of hooks which anchor the opposite ends of the strap to the vehicle seat frame.

2 Claims, 7 Drawing Figures

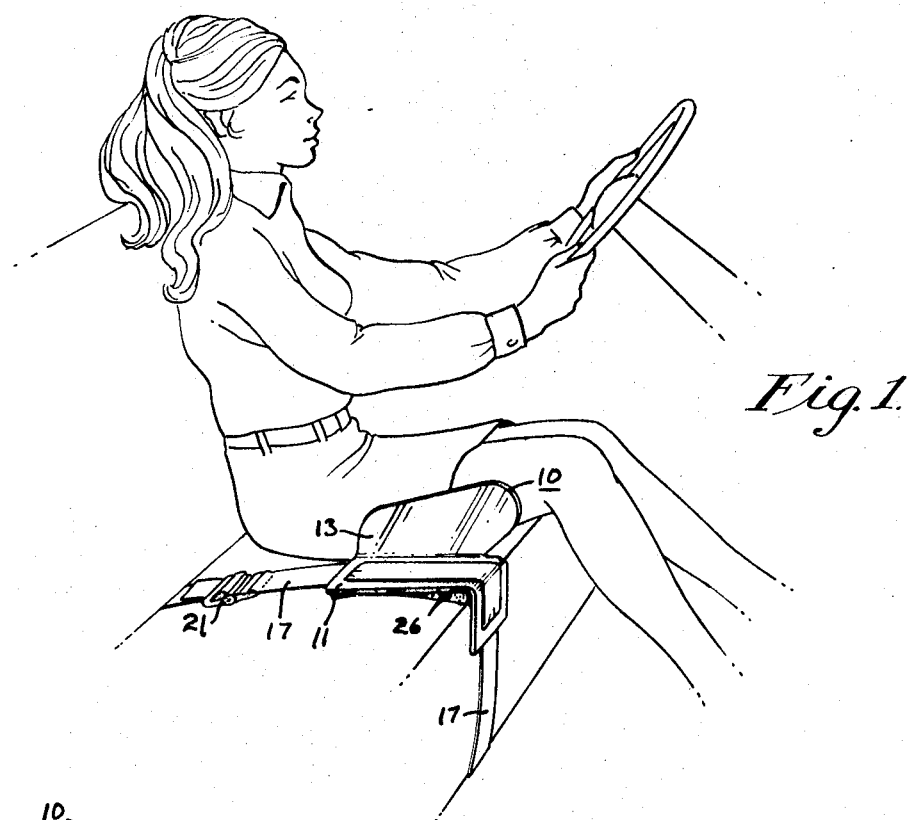
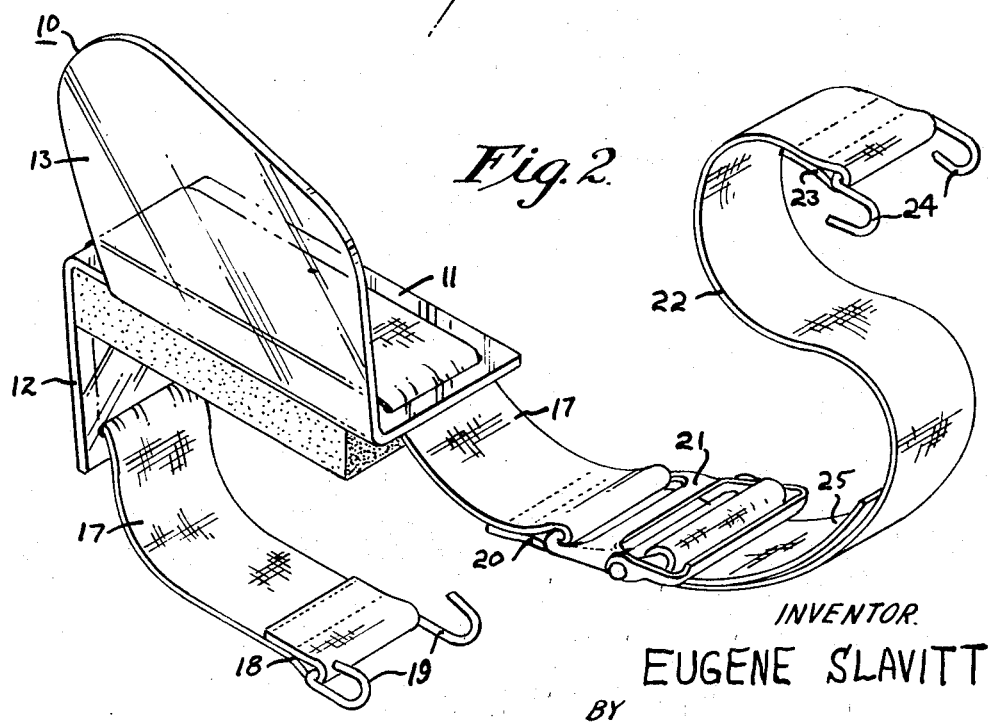

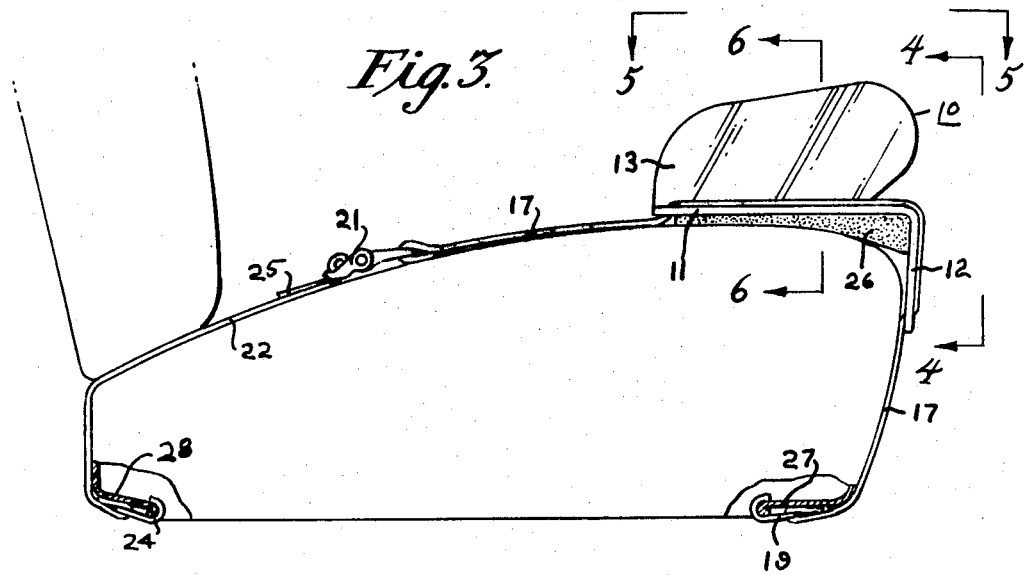
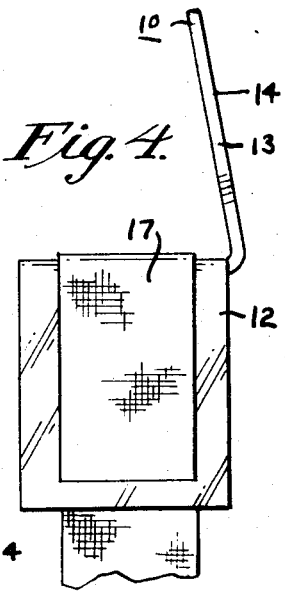
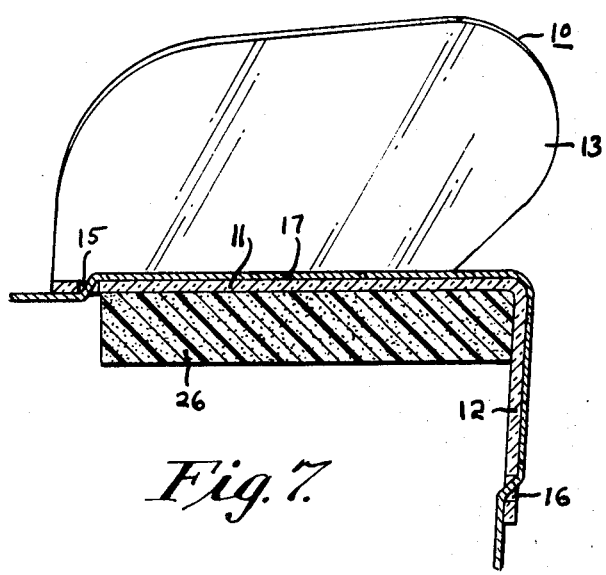
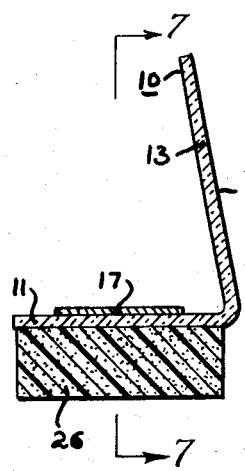

LEG REST FOR VEHICLE DRIVER'S SEAT

This invention relates to vehicle leg rests, and more particularly relates to a device for supporting the throttle operating leg of the driver of an automotive vehicle to maintain the leg in proper throttle operating position while simultaneously preventing the onset of muscle fatigue with attendant back and leg ache.

It is well known that in the use of an automotive vehicle which is operated for any extended period of time on a continuous basis, muscle strains are developed in the lower right side of the back and the right leg of the driver as a consequence of the seat construction in present day automobiles. The construction of automotive bench type seats is such that in driving position the thigh of the driver is raised and the right side of the body weight is supported on the right heel due to the angle of the throttle pedal. The knee is raised to such a position without physical support that after a short time the leg muscles tire and the thigh and leg sag or roll outward to the right in order to provide some supporting bearing engagement of the side of the leg against the seat. Since the foot is confined to the throttle pedal, the leg cannot normally be properly supported by the body muscles in a position which eliminates muscle strain and fatigue.

It is a principal object of the invention to provide a novel leg rest for the driver of an automotive vehicle which provides lateral support to the throttle pedal controlling leg to thereby hold the leg in proper operative position so that the only muscle action involved is that associated with flexing the ankle for suitably operating the throttle pedal.

Another object of the invention is to provide a novel leg rest as aforesaid which is quickly and easily attachable to and detachable from the frame of the normal bench type front seat of an automotive vehicle and which is provided with adjustment means for securing the leg rest in operative position.

Still another object of the invention is to provide a novel leg rest as aforesaid which includes anti-skid means to prevent the leg rest from gradually slipping sideways out of operative position, and which is relatively small, light in weight and inexpensive to manufacture.

The foregoing and other objects of the invention will become clear from a reading of the following specification in conjunction with an examination of the appended drawings, wherein:

FIG. 1 is a perspective view of the novel leg rest according to the invention in an installed in-use condition;

FIG. 2 is a perspective view of the leg rest according to the invention as would be seen from the opposite side to that shown in FIG. 1, on an enlarged scale, and detached from the automotive seat to disclose details of the anchoring structure;

FIG. 3 is a side elevational view of the novel leg rest according to the invention as would be seen from the right side as shown in FIG. 1 with portions of the seat structure broken away to show the anchoring of the leg rest thereto;

FIG. 4 is an enlarged front elevation of the leg rest according to the invention as would be seen when viewed along the line 4—4 of FIG. 3;

FIG. 5 is a top plan view of the leg rest according to the invention, on an enlarged scale, as would be seen when viewed along the line 5—5 of FIG. 3;

FIG. 6 is a vertical section through the leg rest of the invention as would be seen when viewed along the line 6—6 of FIG. 3; and FIG. 7 is a longitudinal section view through the leg rest of the invention as would be seen when viewed along the line 7—7 of FIG. 6.

In the several figures, like elements are denoted by like reference characters.

Referring now to the drawings, it is observed that the leg rest includes a bracket designated generally as 10 having a base wall 11 from the forward end of which depends a front wall 12, and from the left side edge of which upwardly extends a thigh supporting side wall 13. As best seen from the showing of FIG. 7, the front wall 12 inclines slightly rearwardly so that it makes an angle somewhat less than 90° with the base wall 11. As best seen from the showings of FIGS. 4, 5, and 6, the thigh supporting side wall 13 is angularly inclined with respect to the base wall 11 so that it partly overlies the latter and provides an inclined surface 14 for supportably engaging the side of a human thigh.

The base wall 11 is provided proximate to its rear edge with a transversely extending slot 15, and the front wall 12 is provided with a similar transversely extending slot 16 proximate to its lower edge, these slots being most clearly seen in the showing of FIG. 7.

Overlying the upper surface of base wall 11 and the outer surface of front wall 12, and extending respectively downward and inward through slots 15 and 16 is a flat strap 17 terminating at its lower front end in a loop 18 to which is secured a seat frame hook 19, while the other end of the strap 17 terminates in a loop 20 to which is secured a cinching buckle 21. A second strap 22 is provided at one end with a loop 23 to which is secured a seat frame hook 24 of the same type as the frame hook 19. The opposite end of strap 22 terminates in a free tail 25 which is reversely looped through the cinching buckle 21 to provide adjustment of the total strap length formed by the two straps 17 and 22.

The base wall 11 is on the order of three inches in width and occupies so little seat space that a middle seat passenger may still be accommodated. Moreover, no part of the leg rest underlies the driver's leg so that there is no interference with blood circulation. Cemented or otherwise secured to the undersurface of the bracket base wall 11 is a resilient pad 26 made of foam rubber or of a plastic material such as foamed polyurethane.

As best seen from the showing of FIG. 3, the leg rest is installed upon the vehicle seat by first placing the bracket 10 upon the seat with the resilient pad 26 disposed upon the forward upper surface of the seat and with the front wall 12 of the bracket extending downward in front of the nose of the vehicle seat. The frame hook 19 is then slipped rearward under the forward bottom edge of the seat and hooked about the seat front frame bar 27. The strap 17 is of course longitudinally shiftable through the slots 15 and 16 so that the bracket 10 is seated as shown with all slack removed from the strap 17 and with the latter lying flatwise upon the vehicle seat toward the rearward edge thereof. The frame hook 24 secured to one end of the strap 22 is hooked around the seat rear frame bar 28 and extended upward and forward over the upper surface of the vehicle seat where the free tail 25 is looped through the cinching buckle 21 and pulled rearwardly to tension the straps 17 and 22 and compress the resilient pad 26 between the seat and the bracket base wall 11.

The compressed resilient pad 26 prevents marring of the vehicle seat, and also provides substantial frictional engagement with the upper surface of the seat which effectively prevents the bracket 10 from tending to shift sideways away from the driver as a consequence of the lateral pressure exerted on the bracket side wall 13 by the thigh of the driver while at the same time providing a slight resilience of the side wall 13 against the driver's leg. This is very important since a lateral shift of even an inch or two can seriously degrade proper support for the leg. Moreover, the frictional engagement of the resilient pad 26 reduces the amount of tension which need be employed in the straps 17 and 22 to hold the bracket in proper position, and thereby minimizes the wrinkling effect on the vehicle seat which would otherwise be produced by the necessity for constricting the seat cross section by excessive strap tension in an attempt to immobilize the bracket 10 against lateral shifting.

The bracket 10 may be suitably stamped and formed from sheet metal, or preferably from a smooth plastic material which may be either a thermosetting or a thermoplastic compound. Additionally, if desired, the bracket side wall 13 may be provided with suitable apertures to permit the free passage of air therethrough.

Having now described my invention in connection with a particularly illustrated embodiment thereof, it will be appreciated that modifications and variations of the invention may occur from time to time to those persons normally skilled in the art without departing from the essential scope or spirit of the invention, and accordingly it is intended to claim the same broadly as well as specifically as indicated by the appended claims.

What is claimed to be new and useful is:

1. An automotive vehicle leg rest for supporting the throttle pedal operating leg of the seated vehicle driver in a non-fatiguing position n comprising, in combination, a substantially L-shaped bracket member having a horizontally disposed flat section adapted to overlie the vehicle seat in the region immediately adjacent the thigh of the operating leg of the vehicle driver and a depending vertically disposed section adapted to overlie the front surface of the seat to limit rearward shifting of said bracket on said seat, said flat section of the bracket being integrally provided along the side thereof proximate the vehicle driver's thigh with an upstanding side wing part laterally inclined away from the driver's body, said upstanding side wing part having top marginal edge which slopes downwardly and rearwardly from the front of the bracket and a rounded front marginal edge which projects freely forward from a point spaced short of the front end of said flat section of said bracket, said wing part being of an overall length and height adequate to buttress the outer side of the seated driver's thigh in the region thereof closely adjoining the driver's knee, and means for detachably securing said bracket to the seat in operative position to serve as a side rest for buttressing the thigh of the operating driver's leg against outward lateral movement.

2. In a leg rest as defined in claim 1 wherein said securing means consists of a strap threaded in overlying relation to the exposed surfaces of said bracket through slots formed in said horizontal and vertical sections thereof, said strap having freely extending terminal end portions respectively securable to the seat to hold the bracket fixedly positioned thereon.

* * * * *